United States Patent [19]

Tanaka

[11] Patent Number: 5,526,340

[45] Date of Patent: Jun. 11, 1996

[54] ELECTROMAGNETIC OBJECTIVE LENS DRIVING APPARATUS INCLUDING DIRECTLY FORMED CIRCUIT PATTERN

[75] Inventor: Akihiro Tanaka, Tokyo, Japan

[73] Assignee: Asahi Kogaku Kogyo Kabushiki Kaisha, Tokyo, Japan

[21] Appl. No.: 368,718

[22] Filed: Jan. 4, 1995

Related U.S. Application Data

[63] Continuation of Ser. No. 98,055, Jul. 28, 1993, abandoned.

[30] Foreign Application Priority Data

Jul. 28, 1992 [JP] Japan .................................. 4-201043
Dec. 9, 1992 [JP] Japan .................................. 4-329227

[51] Int. Cl.⁶ .............................. G11B 7/08; G11B 21/22
[52] U.S. Cl. ...................... 369/219; 369/44.15; 359/814
[58] Field of Search ................................ 369/215, 219, 369/44.12, 44.14, 44.15, 44.16; 359/814, 823, 824, 819, 813

[56] References Cited

U.S. PATENT DOCUMENTS

| | | | |
|---|---|---|---|
| 4,750,164 | 6/1988 | Nose | 369/44.15 |
| 4,782,476 | 11/1988 | Sekimoto et al. | 369/112 |
| 5,018,836 | 5/1991 | Noda et al. | 369/44.16 |
| 5,073,883 | 12/1991 | Mitsumori | 359/824 |
| 5,257,145 | 10/1993 | Kanazawa et al. | 359/819 |
| 5,321,678 | 6/1994 | Takishima et al. | 369/44.14 |

*Primary Examiner*—Stuart S. Levy
*Assistant Examiner*—George J. Letscher
*Attorney, Agent, or Firm*—Greenblum & Bernstein

[57] ABSTRACT

An electromagnetic objective lens driving apparatus of optical data recording and reproducing apparatus includes a carriage that is movable in a radial direction of an optical disc and an objective lens holder which supports an objective lens in a manner such that laser beams are converged onto the optical disc. The objective lens holder is supported on the carriage and is movable in the focusing and the tracking directions of the optical disc. The apparatus further includes focusing and tracking coils provided on the objective lens holder, and a plastic molded piece provided on the carriage and having electrical wiring that is electrically connected to the focusing and tracking coils.

27 Claims, 13 Drawing Sheets

ELECTROMAGNETIC OBJECTIVE LENS DRIVING APPARATUS INCLUDING DIRECTLY FORMED CIRCUIT PATTERN

This application is a continuation, of application Ser. No. 08/098,055, filed Jul. 28, 1993, now abandoned.

BACKGROUND OF THE INVENTION

1. Field of the Invention

The present invention relates to an optical disc data recording and reproducing apparatus which optically writes data onto or reads data from an optical disc. More precisely, the invention relates to a driving apparatus which electromagnetically drives an objective lens.

2. Description of Related Art

In a known optical disc apparatus, such as an optomagnetic disc apparatus, an objective lens is held or supported on a carriage which is movable in a radial direction (i.e., tracking direction) of the optical disc so as to be movable in the tracking direction and the focusing direction through an elastic member. To drive the objective lens in the tracking direction and the focusing direction, tracking and focusing coils are provided on a lens holder, which holds the objective lens, and a magnetic circuit, which constitutes electromagnetic driving circuits together with the tracking and focusing coils, is provided on the carriage. The focusing and tracking coils are supplied with predetermined directions and intensities of electric current to drive the objective lens holder so as to accurately converge the laser beams onto the recording track of the optical disc.

In such an electromagnetic objective lens driving apparatus, the carriage is moved in the radial direction of the optical disc to move the objective lens holder on the carriage. It is necessary to make the carriage and the lens holder as light as possible to quickly access a designated track and to perform precise focusing and tracking operations. However, in the known apparatus, an electrical wiring board (i.e, printed circuit board) on the carriage makes the movable part large and heavy. The printed circuit board is provided to establish an electrical connection of, and power supply to, the focusing coils and tracking coils secured to the objective lens, or electrical connection of, and power supply to, a sensor which is used for the detection of the objective lens holder position. The printed circuit board may also be used for the transmission of output signals of the sensor, etc. The printed circuit board not only limits the degree to which the apparatus can be made small and light, but also is an obstacle in the assembly of the apparatus.

In the known electromagnetic driving apparatus, the sensitivity at a low frequency band must be high to obtain a high dynamic range. However, to realize this, it is necessary that the compliance of the support mechanism be high, so that the objective lens holder can be easily moved by a small driving force. However, a high compliance leads to an accidental or easy downward movement of the objective lens holder by the dead weight thereof. To prevent this, it is necessary to continuously supply an electric current during the driving operation, so that the objective lens holder is stabilized in a floating neutral position (i.e., servo-position). This, however, increases energy consumption (i.e., electric current) and lowers the driving speed.

The primary object of the present invention is to provide a small and light carriage and objective lens holder without a conventional printed circuit board.

Another object of the present invention is to provide support mechanism of an objective lens holder in which the latter can be magnetically supported even in an inoperative position, so that when an objective lens holder having a high compliance is used, little or no electric current is necessary to float the objective lens holder, unlike the prior art mechanism.

SUMMARY OF THE INVENTION

The present invention is focused on an MID (i.e., Molded Interconnection Device) process which directly forms a printed circuit on a plastic injection molded product. In the present invention, a movable component on the carriage, i.e., a component on which electrical wiring is to be formed is made by plastic injection molding. To make the movable component lighter, a printed circuit having a predetermined pattern is directly formed on the outer surface of the plastic injection molded piece.

The component provided on the carriage, and having an electrical wiring pattern, can be an objective lens holder, a supporting block provided on the carriage to, support the objective lens holder through elastic members such as suspension wires, or a sensor holder provided on the carriage and having a sensor or sensors to detect the position of the objective lens holder. In the present invention, the printed circuit is directly formed on the objective lens holder, the supporting block, or the sensor holder.

The printed circuit formed on the objective lens holder is adapted to electrically connect the focusing coils and the tracking coils and to supply the same with electrical power. The suspension wires, which elastically support the objective lens holder, can be used to electrically connect the focusing coils and the tracking coils. In this case, the printed circuit formed on the supporting block can be used as a power supply line for the suspension wires. The printed circuit formed on the sensor holder can be used as an electrical connection for the sensor or sensors supported by the sensor holder.

Since the movable component on the carriage, i.e., the electrical wiring device has a printed circuit directly formed on the plastic molded piece, rather than using a conventional printed circuit board which is attached as a separate piece, a small, light and simple electromagnetic driving apparatus having fewer components and assembling steps can be obtained.

According to the present invention, an electromagnetic driving apparatus of an objective lens in an optical disc data recording and reproducing apparatus is provided. The apparatus includes a carriage which is movable in a radial direction of the optical disc, and an objective lens holder which supports an objective lens to converge laser beams onto the optical disc and which is supported on the carriage to move in the focusing and the tracking directions of the optical disc. Additionally focusing and tracking coils are provided on the objective lens holder, and a plastic molded piece is provided on the carriage and has electrical wiring connected to the focusing and tracking coils.

The wiring can comprise a predetermined printed circuit pattern which is directly formed on the outer surface of the plastic molded piece.

Preferably, a sensor is provided for detecting the position of the objective lens holder. The sensor can include of a sensor holder provided on the carriage and a pair of photo sensors held by the sensor holder.

The elastic support can be a plurality of suspension wires (e.g., four suspension wires).

Preferably, the printed circuit provided on the plastic mold is provided with terminals for connecting the focusing and tracking coils and for supplying the focusing and tracking coils with electrical power.

According to another aspect of the present invention, an electromagnetic driving apparatus of an objective lens is provided, including a carriage which is movable in a radial direction of the optical disc. An objective lens holder which supports an objective lens to converge laser beams onto the optical disc and which is supported on the carriage to move in focusing and tracking directions of the optical disc is also provide. Additionally a sensor holder is provided on the carriage and includes a sensor to detect the position of the objective lens holder on the carriage, and a predetermined printed circuit pattern directly formed on the outer surface of the sensor holder to constitute electrical wiring for supplying the sensor with electrical power.

The MID process can be applied, for example, to print or draw an image or diagram onto a piece, by utilizing pad printing, printing, an optical plotter, a mechanical plotter, or micro-sand blasting, etc.

Although any of the above mentioned applications can be used in the present invention, it has been experimentally confirmed that optical plotting technology can be advantageously used to form a printed circuit according to the present invention.

The present invention is also directed to an apparatus which prevents or restricts the objective lens holder from moving in the downward direction by the weight thereof. In this apparatus, the magnetic force of the existing focusing permanent magnets or tracking permanent magnets is utilized to produce a magnetic attractive force which compels the objective lens holder in the upward direction. According to this aspect of the present invention, there is provided an electromagnetic objective lens driving apparatus, including a carriage which is movable in a radial direction of the optical disc, an objective lens holder which supports an objective lens to converge laser beams onto the optical disc and which is supported on the carriage to move in focusing and tracking directions of the optical disc. Focusing and tracking coils are provided on the objective lens holder, focusing and tracking permanent magnets are provided on the carriage to constitute focusing and tracking electromagnetic driving circuits in association with the focusing and tracking coils, and a magnetic member is provided on the objective lens holder which is magnetically attracted to at least one of the focusing and tracking permanent magnets. Thus, a magnetic attractive force is created between the magnetic member and the permanent magnets such that the objective holder is compelled in the upwards direction with respect to the carriage.

The magnetic member can be formed by a predetermined printed circuit pattern directly formed on the outer surface of the objective lens holder.

Preferably, the printed circuit formed on the objective lens holder includes terminals to be connected to the focusing and tracking coils to supply the same with electrical power.

In the preferred embodiment, provision is made for a balancing auxiliary magnetic member or members to balance the magnetic force acting on the magnetic member.

The present disclosure relates to subject matter contained in Japanese patent application Nos. HEI 4-201043 (filed on Jul. 28, 1992) and HEI 4-329227 (filed on Dec. 9, 1992) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 9:
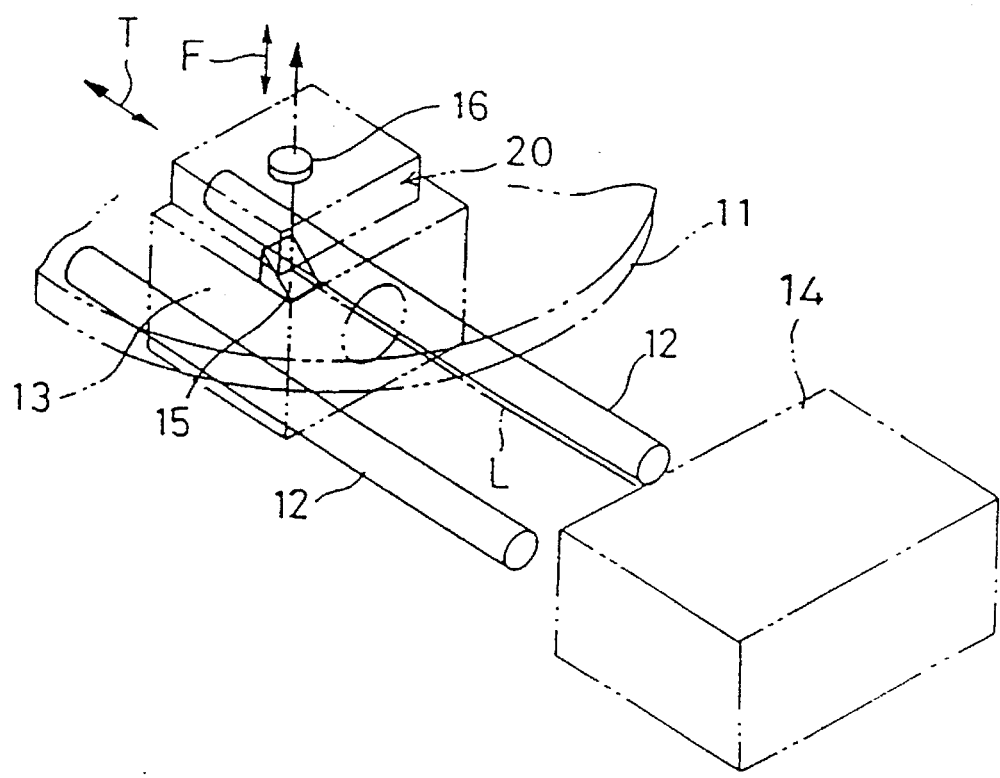
FIG. 9 is an isometric view of main components of an optical data recording and reproducing apparatus to which the present invention is applied.

As shown in FIG. 9, a pair of guide rails 12 are provided below an optical disc 11 which can be rotated and extend in the radial direction of the optical disc 11. A carriage 13 is supported on guide rails 12 to move along the same. Carriage 13 is provided thereon with a prism 15 which reflects the laser beams L, incident thereon from an immovable optical system 14, in the vertical direction. The carriage 13 is further provided with an objective lens 16 which converges the laser beams reflected by prism 15 onto the recording surface of optical disc 11, and an electromagnetic driving mechanism 20 which drives objective lens 16 in the focusing and tracking directions F and T, respectively.

An objective lens holder 21, which holds objective lens 16, is made by plastic injection molding. As can be seen in FIGS. 1 through 5, lens holder 21 is provided on the center portion thereof with a cylindrical holder portion 21a which holds objective lens 16 and a pair of wings 21b which diagonally and symmetrically project from cylindrical holder portion 21a in the radial directions. Namely, wings 21b are aligned along an axis passing through the center of cylindrical holder portion 21a. This axis corresponds to the tracking direction T. Wings 21b are provided therein with coil receiving through holes 21c in which focusing coils 33 are inserted and secured.

Focusing coils 33 lie in a plane in which wings 21b lie. Focusing coils 33 are provided with linear portions 33L extending in parallel with the tracking direction T.

Cylindrical holder portion 21a is provided on the outer surface thereof with two pairs of coil supporting projections 21d and 21e which project from both sides of cylindrical holder portion 21a in diametrically opposed directions perpendicular to the tracking direction T. Upper coil supporting projections 21d are fitted in the center openings of corresponding tracking coils 34. Lower coil supporting projections 21e support the lower surfaces of tracking coils 34 located thereon. Tracking coils 34 lie in respective planes parallel with the plane of focusing coils 33 and are provided with linear coil portions 34L extending in the focusing direction F.

Figure 1:
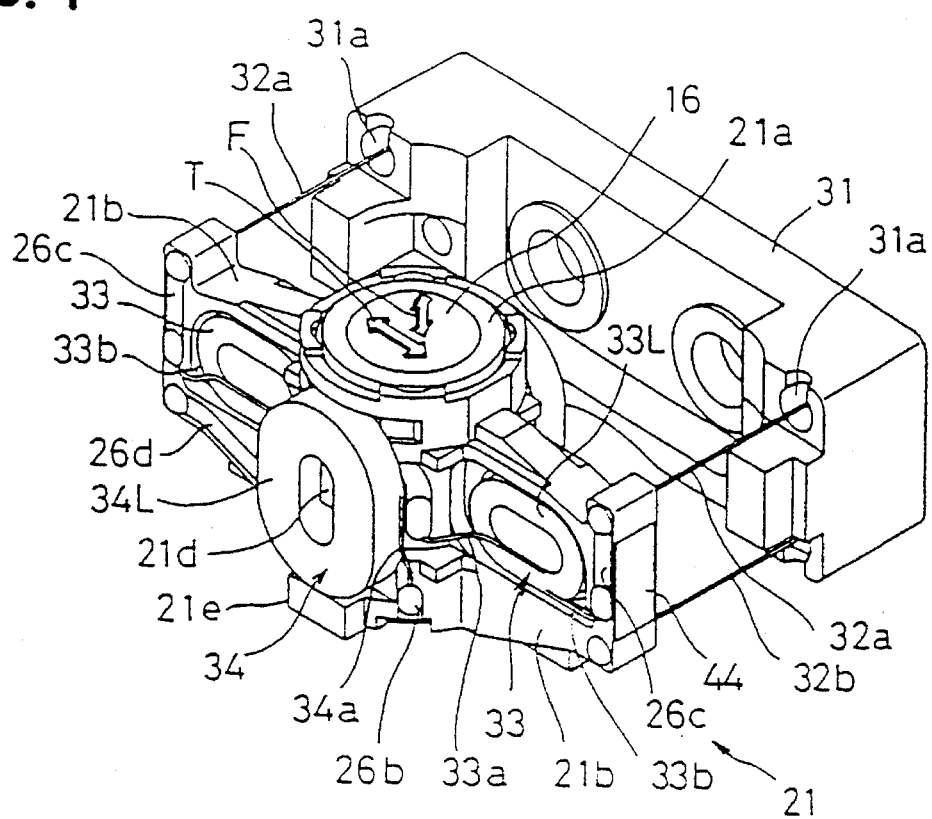
FIG. 1 is a isometric view of main components of an electromagnetic objective lens driving apparatus of an optical disc data recording and reproducing apparatus, according to the present invention.
Figure 2:
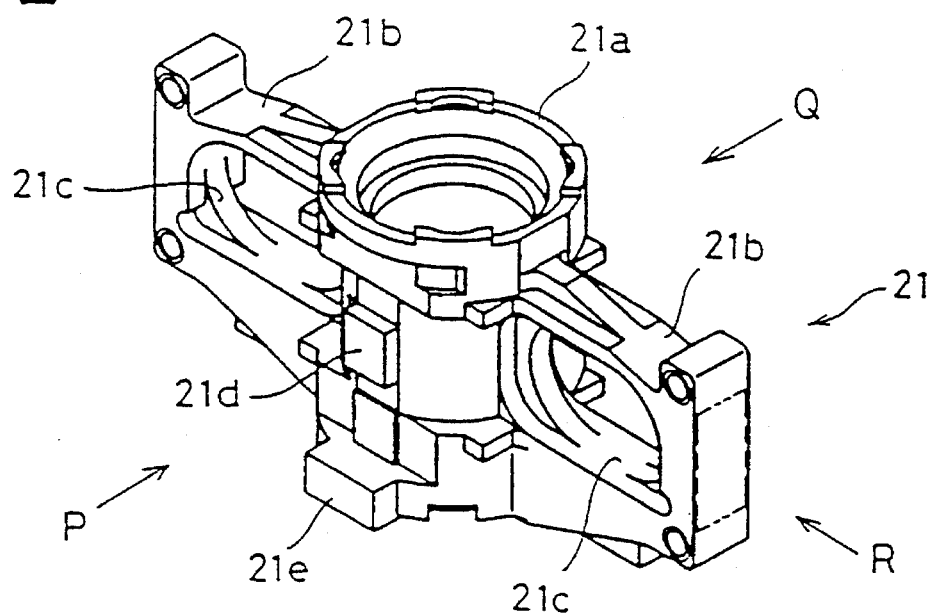
FIG. 2 is an isometric view of an objective lens holder according to the present invention.
Figure 15:
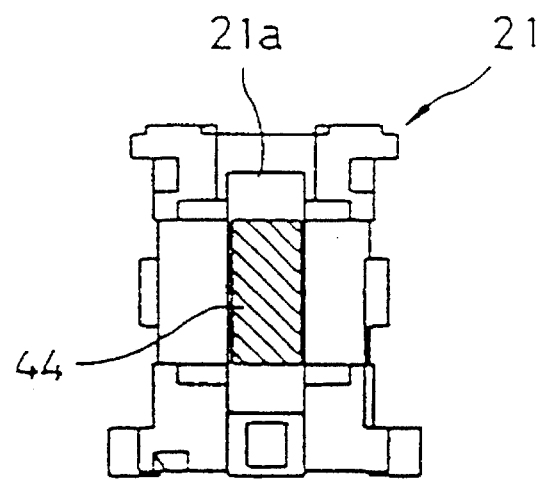
FIG. 15 is an end view of an objective lens holder, showing a reflecting surface thereof, viewed from the direction R shown in FIG. 2.

Objective lens holder 21 is provided, on end surfaces thereon, in the tracking direction T, with reflecting surfaces 44, as shown in FIGS. 1 and 15. Reflecting surfaces 44 are directly formed on the end surfaces of wings 21a of objective lens holder 21, for example by the MID process. The printed circuit is also formed directly on the outer surface of objective lens holder 21 to electrically connect focusing coils 33 in series or tracking coils 34 in series and to supply the focusing and tracking coils with electrical power, for example by the MID process. The printed circuit pattern is shown at hatched portions in FIGS. 3 through 5.

Cylindrical holder portion 21a is provided on the outer surface thereof with a first connecting portion 26a which surrounds one of upper coil supporting projections 21d to connect focusing coils 33, and a second connecting portion 26b which is formed on the lower portion and bottom of cylindrical holder portion 21a to connect tracking coils 34. Wings 21b are provided with current supply portions 26c which supply electrical power to focusing coils 33 and power supply portions 26d which supply electrical power to tracking coils 34. Current supply portions 26c and power supply portions 26d extend to suspension wire connecting holes 27a and 27b, respectively, formed on the upper and lower ends of wings 21b.

Terminal ends 33a (FIG. 1) of the pair of focusing coils 33 are soldered to the ends of first connecting portions 26a. Other terminal ends 33b of focusing coils 33 are soldered to the corresponding current supply portions 26c. Similarly, terminal ends 34a of the pair of tracking coils 34 are soldered to the ends of second connecting portions 26b, and the other terminal ends (not shown) thereof are soldered to the corresponding power supply portions 26d, respectively.

Upper and lower suspension wires 32a and 32b are inserted in and soldered at one end thereof to the corresponding suspension wire connecting holes 27a and 27b. A pair of upper suspension wires 32a constitute a power supply line for the pair of focusing coils 33 connected in series, and a pair of lower suspension wires 32b constitute a power supply line for the pair of tracking coils 34 connected in series, respectively.

Figure 10:
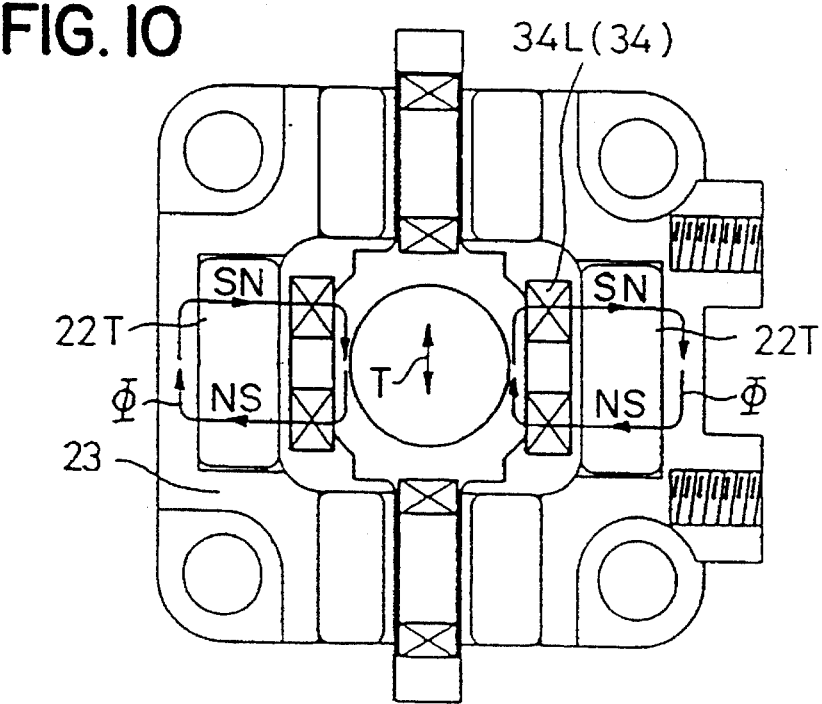
FIG. 10 is a plan view of a magnetic circuit of tracking permanent magnets which constitute an electromagnetic driving circuit, according to the present invention.
Figure 11:
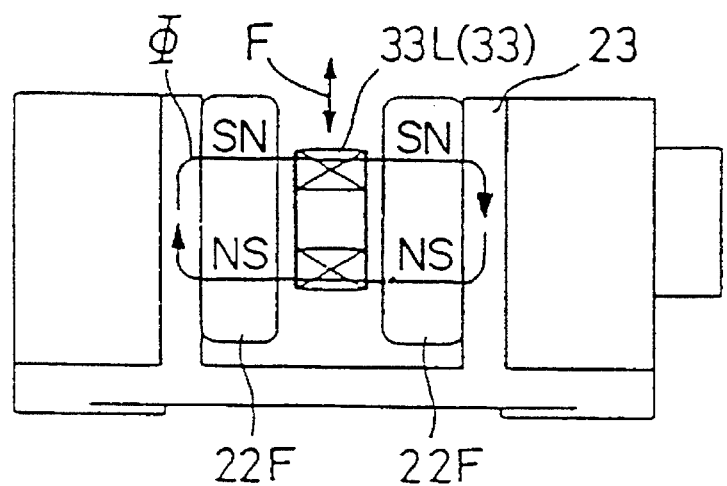
FIG. 11 is a plan view of a magnetic circuit of focusing permanent magnets which constitute an electromagnetic driving circuit, according to the present invention.
Figure 12:
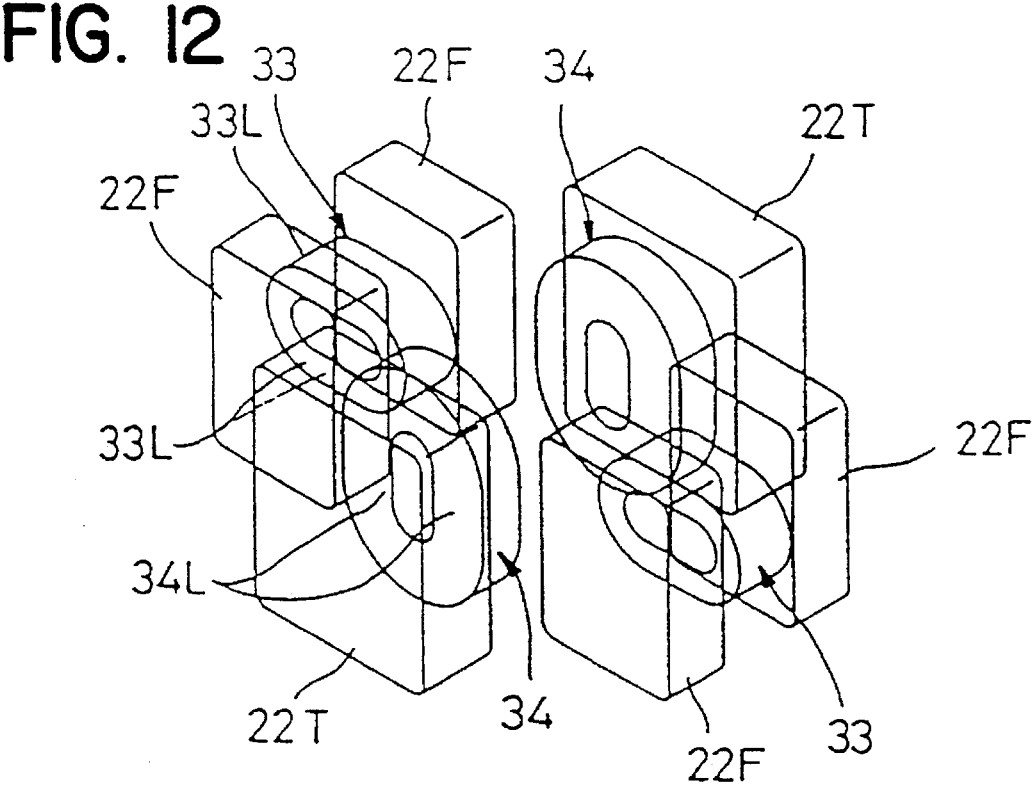
FIG. 12 is an isometric view of an arrangement of focusing and tracking coils and permanent magnets of an electromagnetic circuit, according to the present invention; and, FIG. 13 is a front elevational view of a printed circuit of a supporting block.

The magnetic circuit which constitutes electromagnetic driving circuits together with focusing coils 33 and tracking coils 34 is provided on carriage 13. The magnetic circuit includes of two pairs of focusing permanent magnets 22F, a pair of tracking permanent magnets 22T, and a yoke member 23 made of a magnetic material. The two focusing permanent magnets 22F of each pair are located on opposite sides of each focusing coil 33 of each wing 21b. The two tracking permanent magnets 22T are located on opposite sides of cylindrical holder portions 21a, so that a pair of tracking coils 34 are placed between tracking permanent magnets 22T. The arrangement of the focusing and tracking permanent magnets 22F and 22T and the polarities thereof, are shown in FIG. 10 through 12. The polarities of focusing and tracking permanent magnets 22F and 22T are such that linear coil portions 33L and 34L of focusing coils 33 and tracking coils 34 are perpendicular to the magnetic flux $\Phi$ produced by focusing permanent magnets 22F and tracking permanent magnets 22T. Consequently, the driving force in the focusing direction F (i.e., up and down directions) is produced in objective lens holder 21 in accordance with the electric current flowing in linear coil portions 33L in the forward direction or reverse direction. Similarly, the driving force in the tracking direction T (i.e., forward and reverse direction) is produced in objective lens holder 21 in accordance with the electric current flowing in linear coil portions 34L in the forward direction or the reverse direction thereof.

The focusing (i.e., focus controlling) electromagnetic circuit formed by focusing coils 33 and focusing permanent magnets 22F is arranged so as not to interfere with the tracking (i.e., tracking controlling) electromagnetic circuit formed by tracking coils 34 and tracking permanent magnets 22T. Consequently, no driving force in the tracking direction T is produced in objective lens holder 21 by the electric current flowing in focusing coils 34, and no driving force in the focusing direction F is produced in objective lens holder 21 by the electric current flowing in tracking coils 34. Thus, a precise and independent control in the tracking and focusing directions T and F can be achieved.

Figure 7:
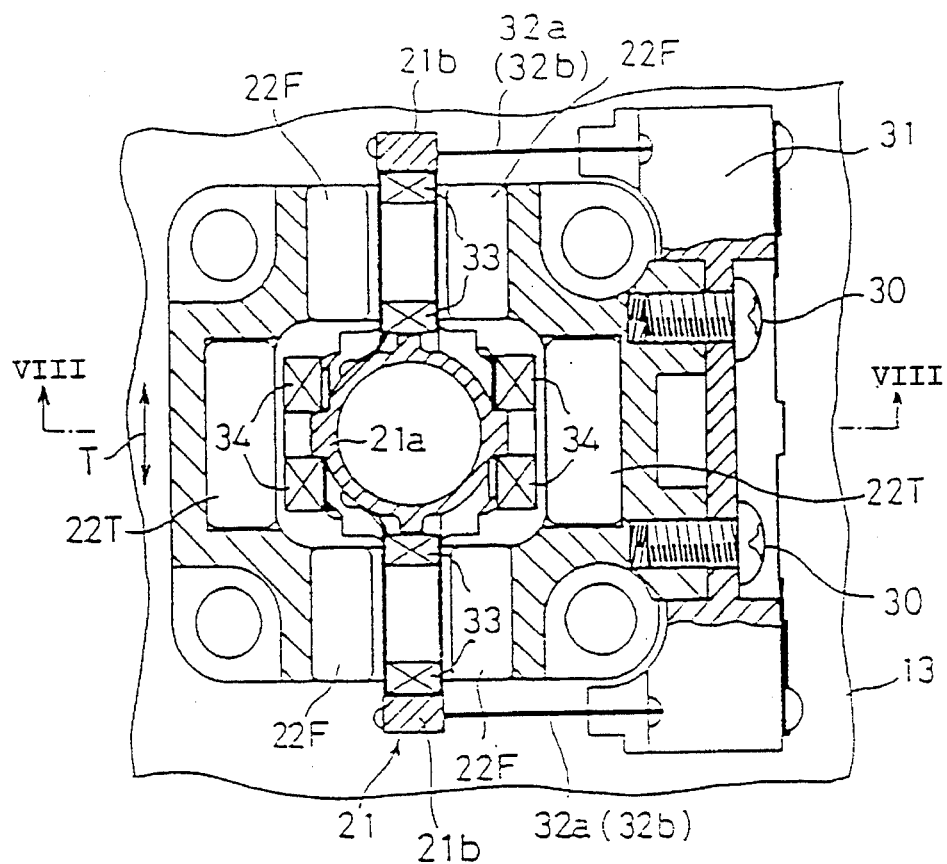
FIG. 7 is a sectional view along the line VIII—VIII in FIG. 8.
Figure 8:
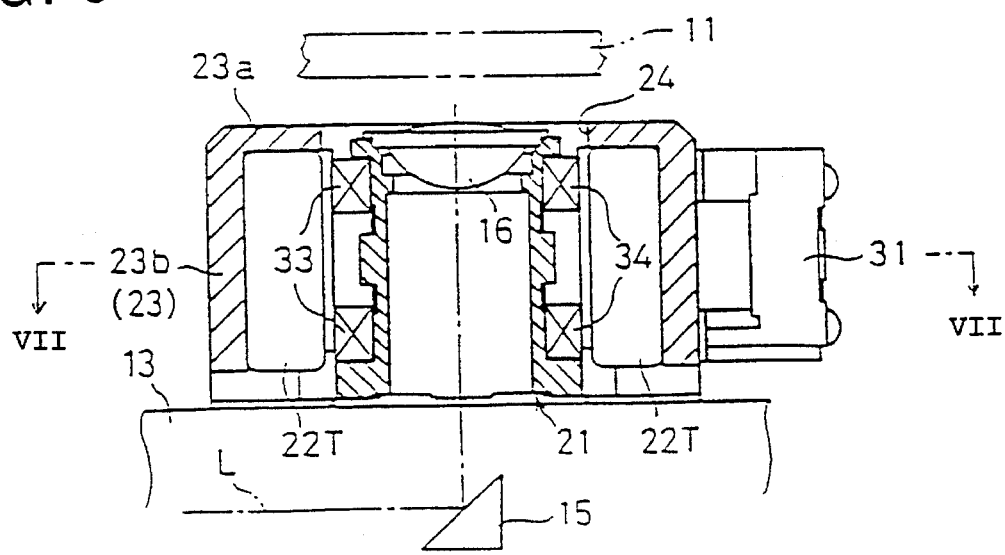
FIG. 8 is a sectional view along the line VII—VII in FIG. 7.

Yoke member 23 which supports focusing permanent magnets 22F and tracking permanent magnets 22T includes a magnetic shield wall 23a opposed to the optical disc 11 in parallel therewith, a plurality of yoke walls 23b projecting perpendicularly from the peripheral edge of the magnetic shield wall 23a towards carriage 13, and a plurality of mounting flanges 23c which extend from yoke walls 23b and lie on carriage 13. Magnetic shield wall 23a, yoke walls 23b, and mounting flanges 23c are an integral structure. Magnetic shield wall 23a is provided with a laser transmission hole 24 in which objective lens 16 is movable, so that the laser beams L pass through laser transmission hole 24. Mounting flanges 23c are secured to carriage 13 by mounting screws 25. Supporting block 31 is secured to yoke member 23 by mounting screws 30 (FIG. 7).

The ends (right ends in FIG. 7) of the suspension wires 32a and 32b are secured to supporting block 31. Objective lens holder 21 and, accordingly, objective lens 16 are movable in the focusing direction F and the tracking direction T by the elasticity of suspension wires 32a and 32b. Suspension wire receiving holes 31a of supporting block 31 have a diameter sufficiently larger than the diameter of suspension wires 32a and 32b, so that the spaces between suspension wire receiving holes 31a and associated suspension wires 32a and 32b are preferably filled with an appropriate damper (e.g., gel, etc.) to damp the oscillation of suspension wires 32a and 32b.

Figure 13:
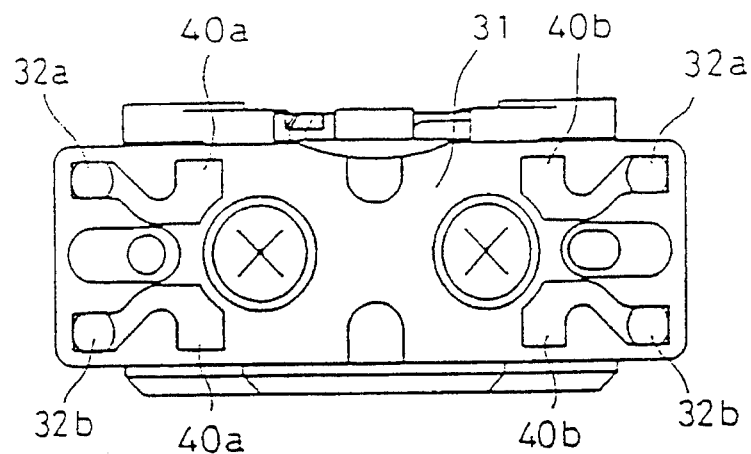
Figure 14:
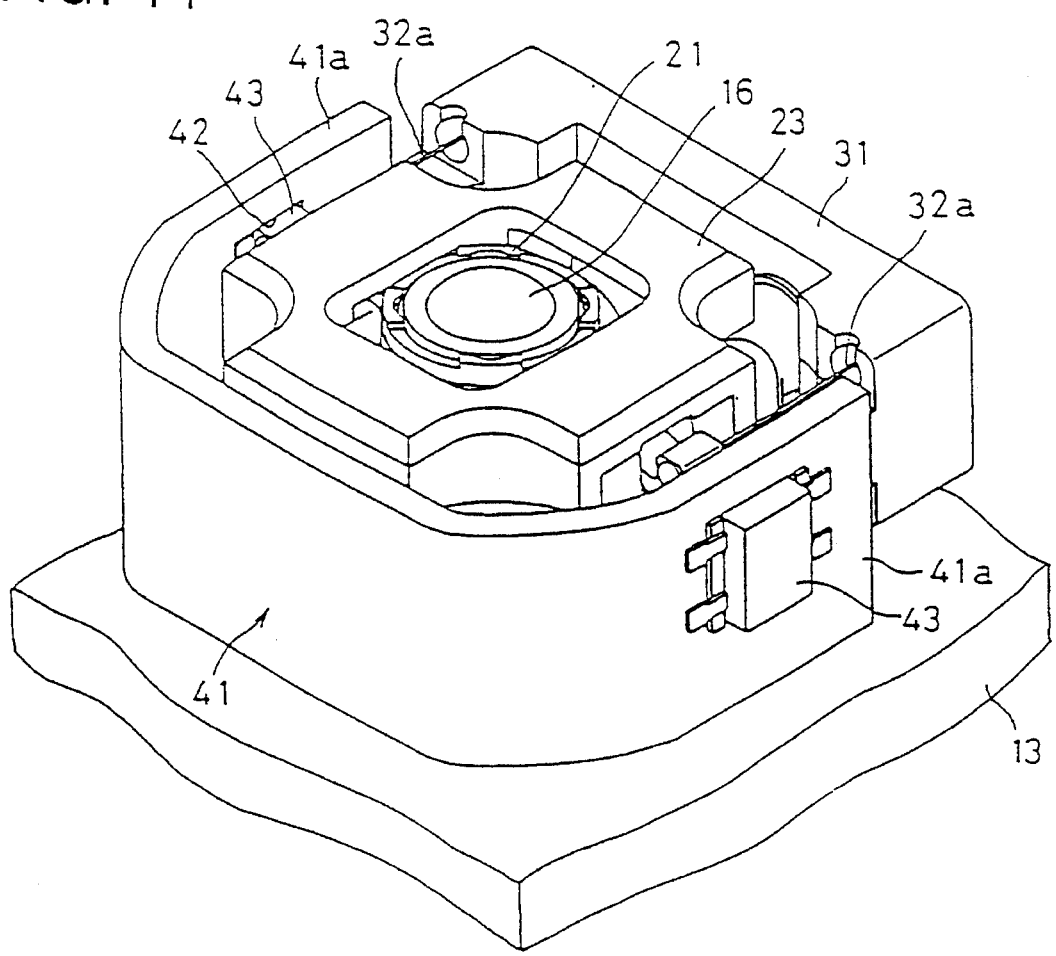
FIG. 14 is an isometric view of main components of an electromagnetic objective lens driving apparatus including a sensor holder, according to another aspect of the present invention.

Supporting block 31 is made by plastic injection molding, and is provided with the electrical circuit printed thereon, for example, by the MID process to supply the electric power to suspension wires 32a and 32b. The printed circuit pattern shown in FIG. 13 includes power supply terminals 40a and 40b connected to suspension wires 32a and 32b, respectively.

Sensor holder 41 which is adapted to detect the position of objective lens 16 (or objective lens holder 21) is also provided with a printed circuit. Sensor holder 41, which is secured to carriage 13, is generally U-shaped to surround the three surfaces (including the two surfaces in the tracking direction T) of yoke member 23, which is generally rectangular in a plan view. Sensor holder 41 includes two opposed side walls 41a perpendicular to the tracking direction T, that are provided therein with sensor mounting windows 42 in which a pair of reflection type photo sensors 43 are fitted and secured. Photo sensors 43 are opposed to the corresponding reflecting surfaces 44 of objective lens holder 21.

Each of the reflection type photo sensors 43 includes a light emitter 43a located next to optical disc 11 and a light receiver 43b distant from optical disc 11, so that beams of light emitted from light emitters 43a are reflected by corresponding reflecting surfaces 44 and are then received by associated light receivers 43b.

Figure 16:
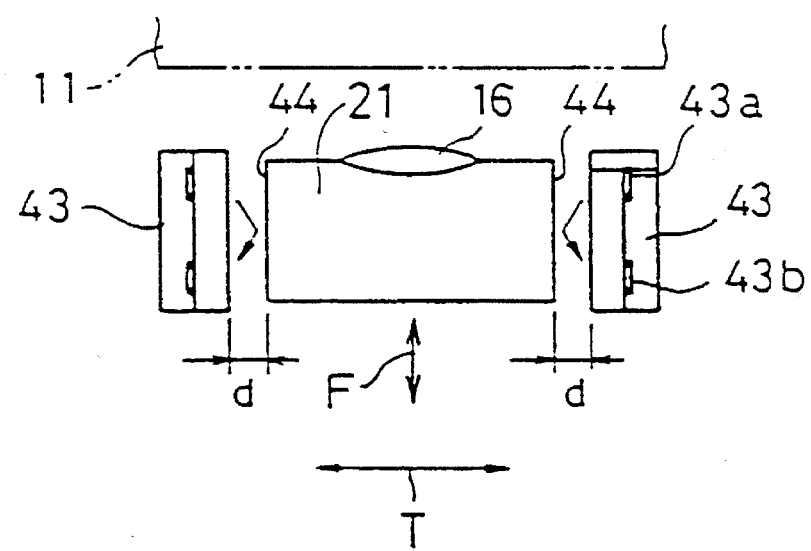
FIG. 16 is a front elevational view of a reflection type photo sensor and a reflecting surface of an objective lens holder.
Figure 17:
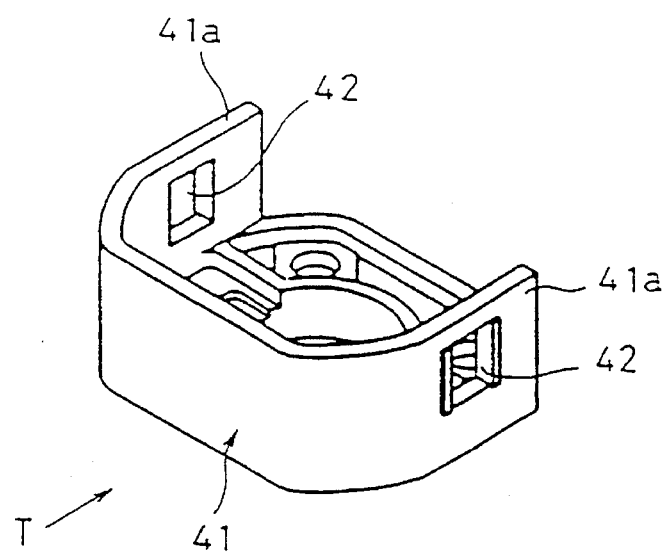
FIG. 17 is an isometric view of a sensor holder.
Figure 21:
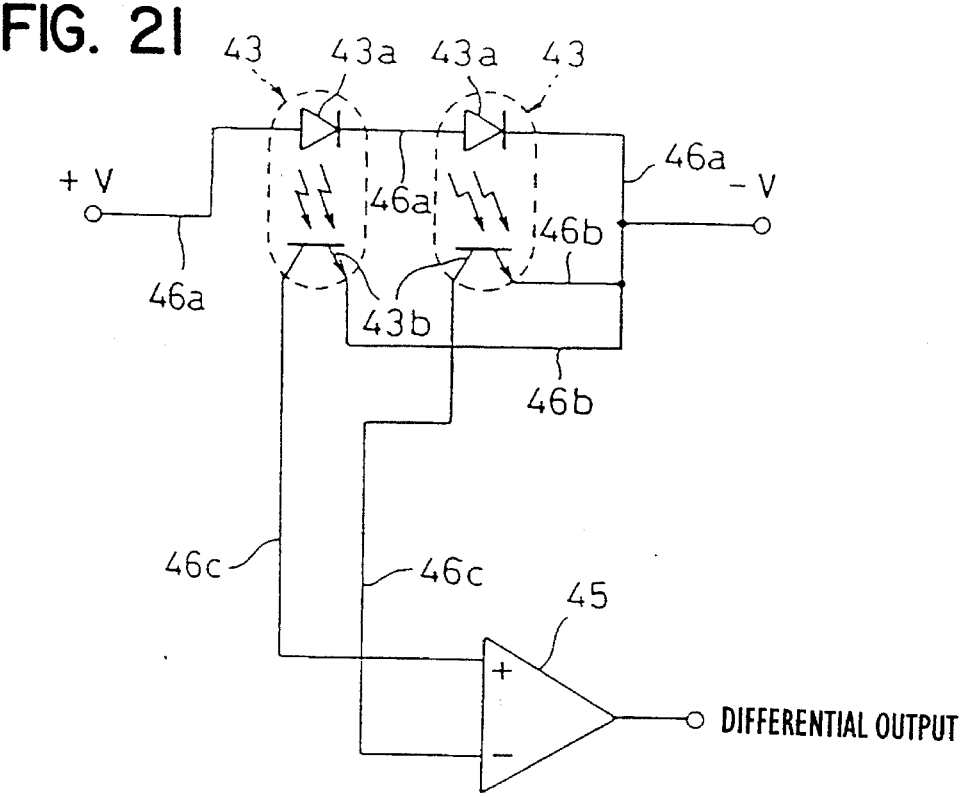
FIG. 21 is a circuit diagram of an electrical connection of a pair of reflection type sensors.
Figure 22:
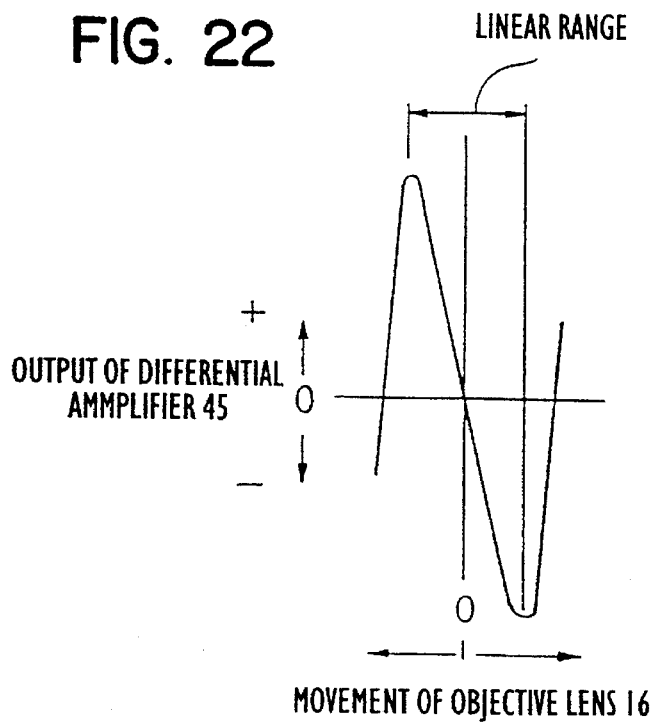
FIG. 22 is a diagram showing a relationship between outputs of a differential amplifier as shown in FIG. 21 and displacement and direction of an objective lens; and, FIG. 23 is a side view of focusing permanent magnets and a magnetic member of an objective lens holder.

FIG. 21 shows an electric connection between the two reflection type photo sensors 43. In the arrangement shown in FIG. 21, light emitters 43a are electrically connected to a power source and the output terminals of light receivers 43b are connected to positive and negative input terminals of differential amplifier 45, respectively. The outputs of light receivers 43b vary in accordance with the change of the distance "d" (FIG. 16) between reflection type photo sensors 43 and the associated reflecting surfaces 44. Accordingly, displacement of objective lens holder 21 (or objective lens 16) from the neutral position thereof, in the tracking direction T, can be detected in accordance with the outputs of differential amplifier 45, as shown in FIG. 22.

Figure 18:
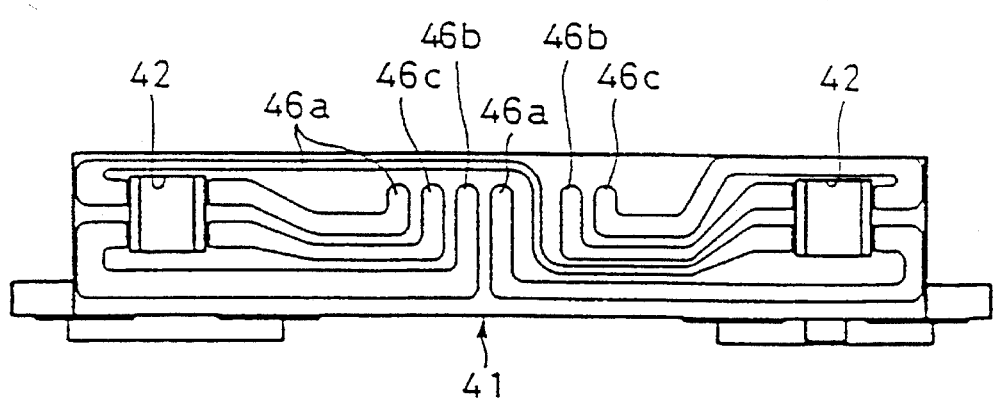
FIG. 18 is a developed view of a printed circuit of a sensor holder, viewed in the direction T shown in FIG. 17.

Sensor holder 41 is made by plastic injection molding and is provided on the outer surface thereof with a circuit pattern printed thereon to surround the reflection type photo sensors 43, for example, by the MID process, as shown in FIG. 18. The printed circuit includes power supply terminals 46a connected to light emitters 43a of the reflection type photo sensors 43, power supply terminals 46b connected to light receivers 43b, and output terminals 46c of light receivers 43b.

Figure 19:
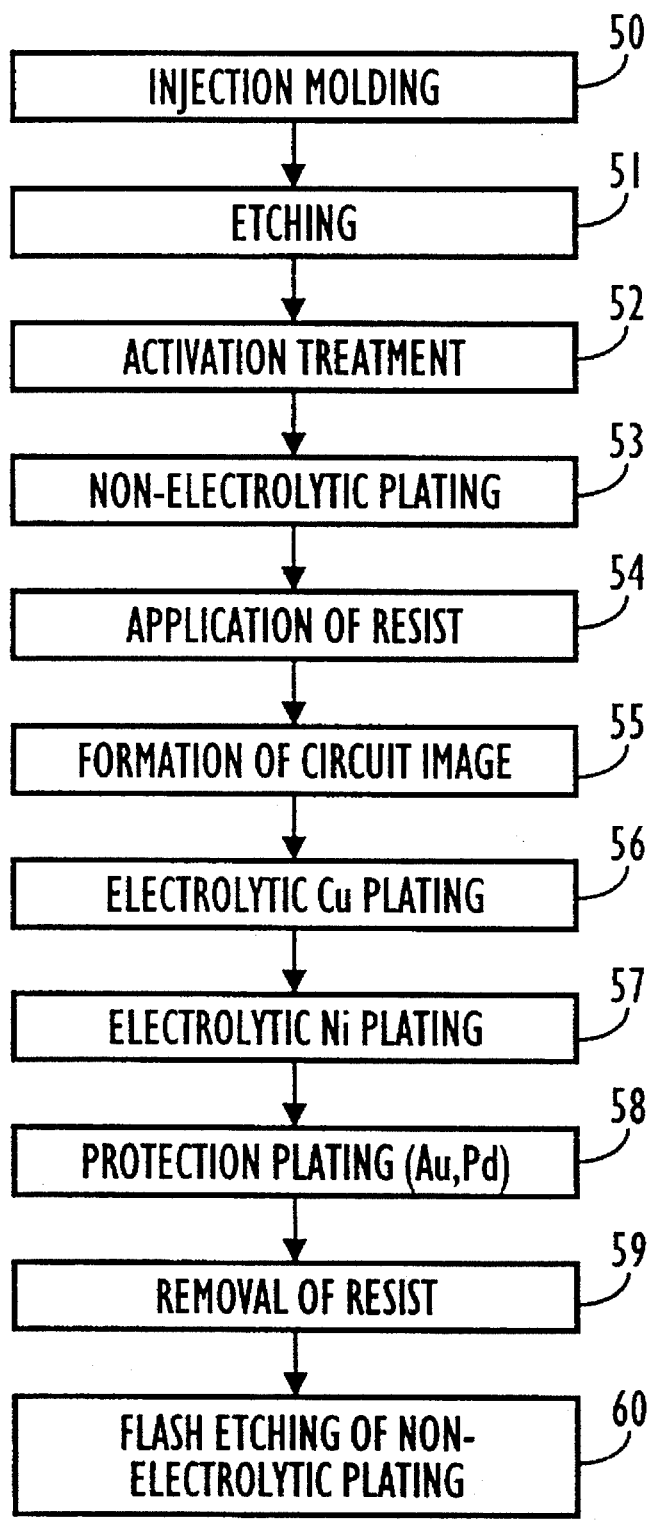
FIG. 19 is a block diagram outlining a formation of a printed circuit using a molded interconnection device (MID) process, according to the present invention.

FIG. 19 shows an optical plotting process for simultaneously forming the printed circuit (i.e., circuit elements 26a through 26e) of objective lens holder 21, printed circuits 40a and 40b of supporting block 31, reflecting surfaces 44, and a printed circuit of sensor holder 41 (i.e., circuit elements 46a through 46c) of sensor holder 41, using the MID process by way of example.

First, objective lens holder 21, supporting block 31, and sensor holder 41 are injection molded at step 50. Thereafter, the molds thus obtained are subject to an etching process 51, and an activation treatment 52, and are then uniformly plated by a non-electrolysis plating process. Thereafter, the plated molds are coated with a photo-etching resist layer by a resist applying process 54. After that, a predetermined image of circuit pattern is formed by an optical circuit imaging process 55. The circuit pattern image is subject to an electrolytic copper plating process 56, an electrolytic nickel plating process 57, and a protection plating process 58, so that the image is actualized as a circuit pattern. Thereafter, the unnecessary residual resist layer is removed by a resist removal process 59, and then the molds are finished by being subject to a flash etching process 60 of the non-electrolytic plating.

In the electromagnetic driving mechanism 20, as constructed above, a driving current for the focusing operation is supplied to focusing coils 33 through suspension wires 32a, and the driving current for the tracking operation is supplied to tracking coils 33 through suspension wires 32b, respectively. When the focusing driving current is supplied to focusing coils 33, objective lens holder 21 and, accordingly, objective lens 16 are electromagnetically driven in the focusing direction F in accordance with the direction and intensity of the driving current supplied thereto. Similarly, when the tracking driving current is supplied to tracking coils 34, objective lens holder 21 and, accordingly, objective lens 16, are electromagnetically driven in the tracking direction T in accordance with the direction and intensity of the driving current supplied thereto. Thus, the laser beams L can be correctly converged onto a predetermined recording track of optical disc 11 by objective lens 16, in accordance with the control of the driving current to be supplied to focusing coils 33 or tracking coils 34.

Figure 20:
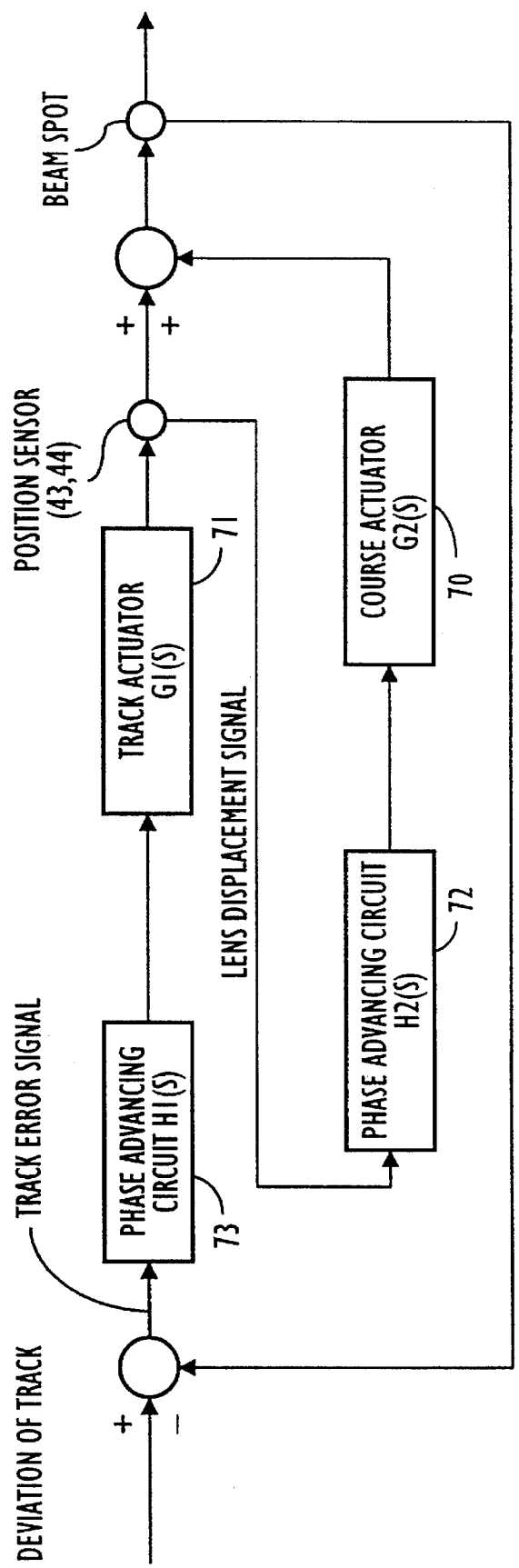
FIG. 20 is a block diagram of a tracking control operation of an objective lens, by way of example.

FIG. 20 shows a block diagram of a tracking control including a course actuator 70 for moving carriage 13, and a track actuator 71, formed by tracking permanent magnets 22T and tracking coils 34. Carriage 13 is moved along guide rails 12 in the radial direction of optical disc 11 by course actuator 70 and a phase advancing circuit 72, in accordance with the tracking signals. If the laser beam is not converged onto optical disc 11 by objective lens 16, objective lens 16 (i.e., objective lens holder 21) is moved through phase advancing circuit 73 and track actuator 71 in accordance with a track error signal. If there is a large displacement of objective lens 16 by track actuator 71, the track error signal changes due to the change in the distribution of the quantity of light. To prevent this, the position of objective lens 16 is detected by a position sensor constituted by reflection type photo sensors 43 and reflecting surfaces 44, so that carriage 13 is moved in a direction to cancel the track error by the feed-back control system in accordance with the position data.

The following discussion will be addressed to another subject of the present invention, i.e., a floating mechanism of objective lens holder 21 by focusing permanent magnets 22F.

Figure 23:
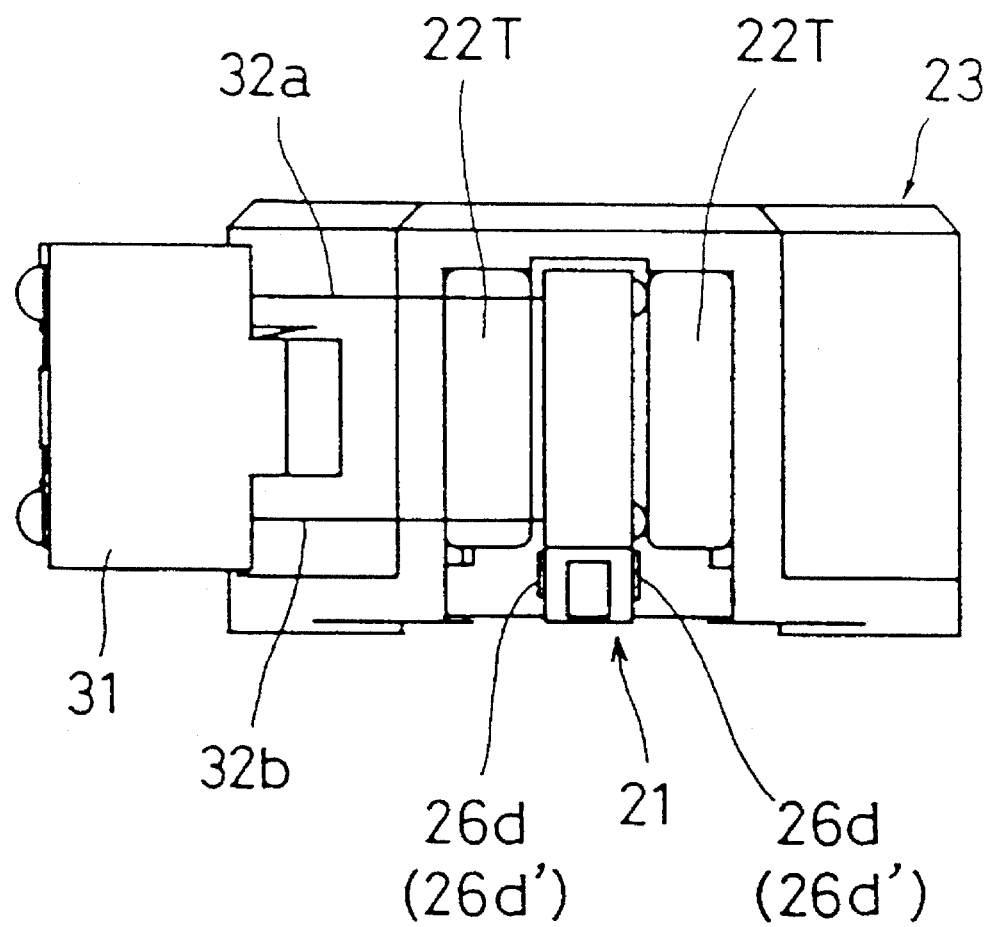

The arrangement of the focusing permanent magnets, the magnetic circuit formed thereby, and the direction of the magnetic flux $\Phi$ are shown in FIGS. 11 and 12. Current supply portions 26d of the printed circuit are formed on the lower halves of the surfaces of objective lens holder 21 opposed to permanent magnets 22F. FIG. 23 shows a positional relationship between permanent magnets 22F and current supply portions 26 of objective lens holder 21.

The printed circuits are formed in the process shown in FIG. 19. The current supply portions 26 contain therein a magnetic material, such as nickel (Ni). Consequently, current supply portions 26 receive the magnetic attractive force in the upward direction from the focusing permanent magnets 22F, so that objective lens holder 21 is suspended. The magnetic attractive force is produced by permanent magnets 22F, regardless of the supply of current to the focusing coils 33. Consequently, the weight of objective lens holder 21 is at least somewhat decreased by the magnetic attractive force. Accordingly, the downward movement of objective lens holder 21, due to the weight thereof is countered.

Figure 3:
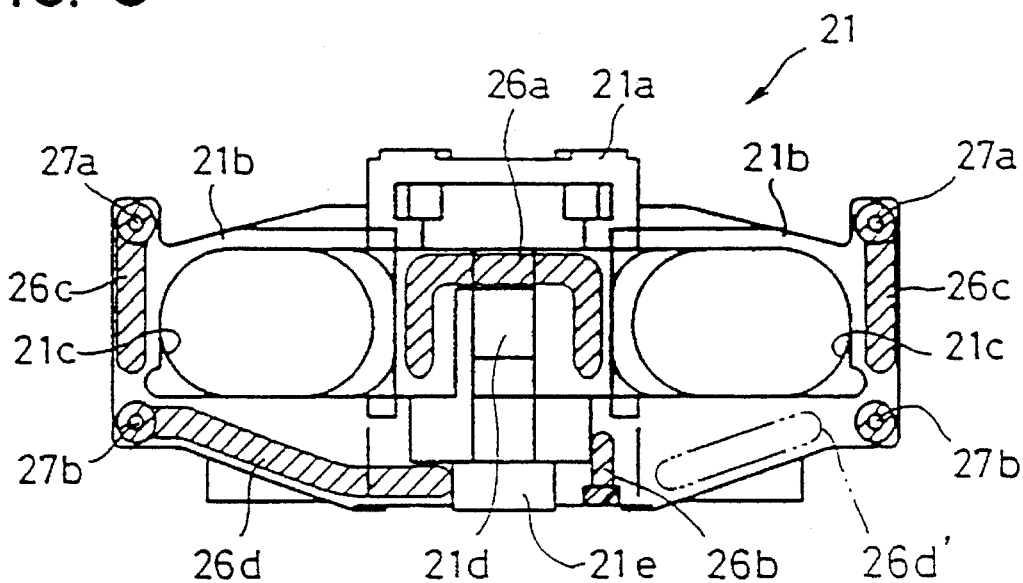
FIG. 3 is an end view of an objective lens holder, viewed from the direction P shown in FIG. 2.
Figure 4:
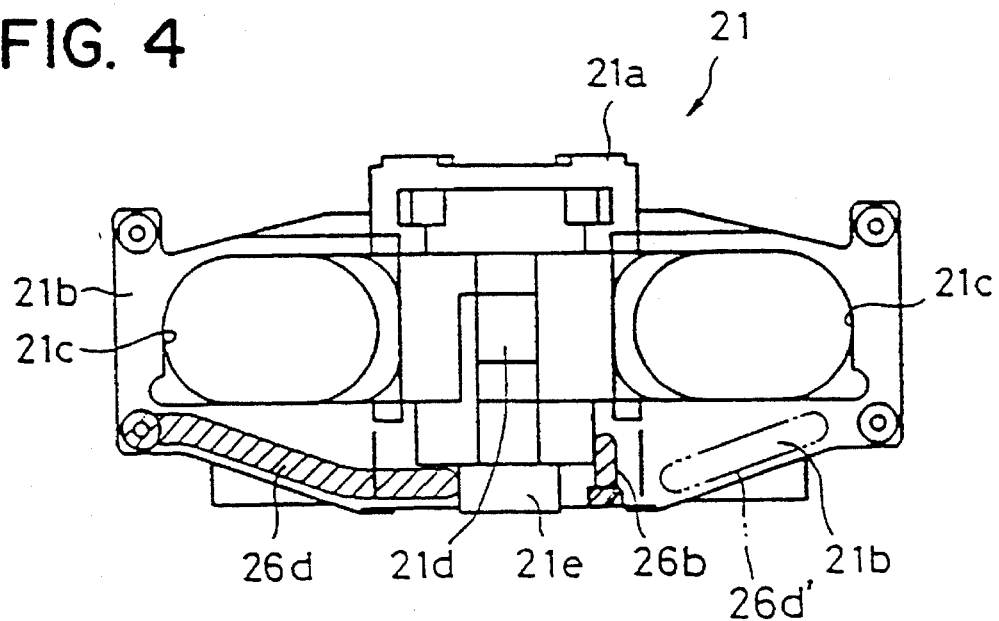
FIG. 4 is an end view of an objective lens holder, viewed from the direction Q shown in FIG. 2.
Figure 5:
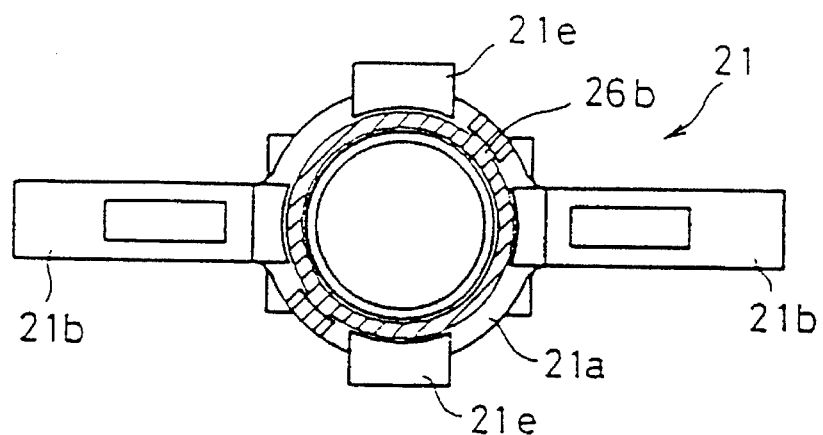
FIG. 5 is a bottom view of an objective lens holder, shown in FIG. 2.
Figure 6:
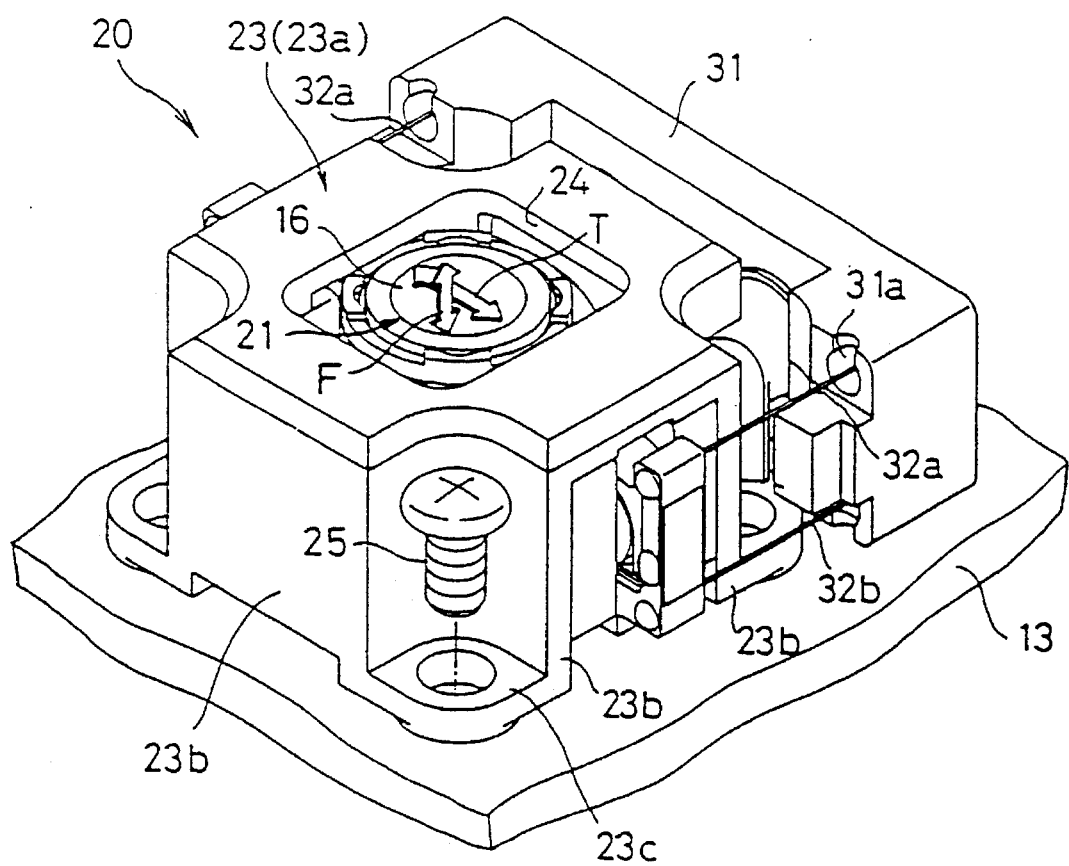
FIG. 6 is an isometric view of main components of an electromagnetic objective lens driving apparatus of an optical disc data recording and reproducing apparatus, according to another aspect of the present invention.

Preferably, objective lens holder 21 is provided with auxiliary magnetic members 26d' which are symmetrically located, with respect to current supply portions 26d and the objective lens 16, in the tracking direction T, as shown in FIGS. 3 and 4 to balance the magnetic attractive force. Auxiliary magnetic members 26d' can also be made of a printed circuit which is formed, for example, by the MID process.

It goes without saying that the magnetic members (i.e., printed circuits) which produce the magnetic attractive force of objective lens holder 21 can be formed by means other than the MID process. For instance, the magnetic members can be adhered to objective lens holder 21 by an adhesive, or the like.

Although the magnetic members (i.e., printed circuits), which produce the magnetic attractive force of objective lens holder 21, are associated with focusing permanent magnets 22F in the illustrated embodiments, it is possible to arrange the magnetic members so as to receive the magnetic force of tracking permanent magnets 22T, so that objective lens holder 21 receives both the magnetic attractive force produced by the magnetic members and the tracking permanent magnets 22T.

As can be understood from the above discussion, according to the present invention, since the member, having electrical wiring and provided on the carriage as a movable component of an optical data recording and reproducing apparatus, is made by plastic injection molding, and since the printed circuit is directly formed on the molded piece as electrical wiring, a separate printed circuit board is not necessary, unlike prior art in which a separate printed circuit board is indispensable. Accordingly, a small, light and simple electromagnetic driving apparatus having a fewer number of components and assembling steps may be obtained.

Furthermore, according to the present invention, the weight of the objective lens holder can be at least partially and magnetically supported by the magnetic force of the permanent magnets. Consequently, even if the compliance of the objective lens holder is high, little or no continuous electric current is necessary to retain the objective lens holder in a floating neutral position (i.e., servo-position) thereof.

I claim:

1. An electromagnetic objective lens driving apparatus of an optical disk data recording and reproducing apparatus, comprising:

a carriage that is movable in a radial direction of the optical disk;

a supporting block secured to said carriage for supporting an objective lens holder through a plurality of suspension wires;

said objective lens holder supporting an objective lens, wherein one end of each of said suspension wires is connected to said supporting block and an other end of each of said suspension wires is connected to said objective lens holder, so that said objective lens holder is elastically supported and movable in focusing and tracking directions of the optical disk;

focusing and tracking coils provided on said objective lens holder;

focusing and tracking permanent magnets provided on said carriage which, in association with said focusing and tracking coils, comprise focusing and tracking electromagnetic drive circuits; and a magnetic member provided on said objective lens holder, said magnetic member being magnetically attracted to at least one of said focusing and tracking permanent magnets, said magnetic member comprising a printed circuit pattern having a current supply portion for supplying electrical power to at least one of said focusing and tracking coils, said printed circuit pattern being directly formed on a lower half of an outer surface of said objective lens holder in opposed relation to said at least one permanent magnet, such that a magnetic attractive force created between the magnetic member and said at least one permanent magnet urges said objective lens holder in the upward direction when said objective lens holder is located at a neutral position, thereby reducing a load on said suspension wires in the focusing direction.

2. The electromagnetic objective lens driving apparatus of claim 1, wherein said magnetic member is an objective lens holder support supplemental to said elastic support.

3. The electromagnetic objective lens driving apparatus of claim 2, wherein said printed circuit pattern formed on the objective lens holder includes terminals to be connected to the focusing and tracking coils to supply the coils with electrical power.

4. The electromagnetic objective lens driving apparatus of claim 2, wherein said magnetic attractive force between said magnetic member and said permanent magnets is balanced.

5. The electromagnetic objective lens driving apparatus of claim 1, further comprising an auxiliary magnetic member that balances the magnetic attractive force between said magnetic member and said permanent magnets.

6. The electromagnetic objective lens driving apparatus of claim 1, wherein at least one of said tracking coils is positioned between a pair of said tracking permanent magnets.

7. An electromagnetic objective lens driving apparatus of an optical disk data recording and reproducing apparatus, comprising:

a carriage that is movable in a radial direction of an optical disk;

an objective lens holder that supports an objective lens in such a manner that laser beams are converged onto the optical disk, said objective lens holder being supported on said carriage and movable in focusing and tracking directions of the optical disk, said objective lens holder comprising a reflective surface formed on an outer surface of said objective lens holder;

a sensor holder provided on said carriage for supporting a sensor that cooperates with said reflective surface and detects a position of said objective lens holder, said sensor holder comprising a predetermined printed circuit pattern directly formed on an outer surface of said sensor holder for electrically connecting and supplying said sensor with electrical power.

8. The electromagnetic objective lens driving apparatus of claim 7, further comprising a supporting block provided on the carriage to support the objective lens holder through an elastic support.

9. The electromagnetic objective lens driving apparatus of claim 8, wherein said elastic support comprises a plurality of suspension wires.

10. The electromagnetic objective lens driving apparatus of claim 9, wherein said sensor holder comprises a molded plastic piece provided on said carriage and having electrical wiring for connecting and supplying said sensor with electrical power.

11. The electromagnetic objective lens driving apparatus of claim 9, wherein said objective lens holder comprises electrical wiring for connection with focusing and tracking coils provided on said objective lens holder, and said supporting block comprises a molded plastic piece provided on said carriage and having electrical wiring for connection with said focusing and tracking coils, wherein said wiring of said supporting block comprises a predetermined printed circuit pattern that is directly formed on an outer surface of said supporting block.

12. The electromagnetic objective lens driving apparatus of claim 11, wherein said wiring of said objective lens holder comprises a predetermined printed circuit pattern that is directly formed on the outer surface of said objective lens holder, said printed circuit pattern being provided with terminals for connecting the focusing and tracking coils and for supplying the focusing and tracking coils with electrical power.

13. The electromagnetic objective lens driving apparatus of claim 11, wherein four suspension wires electrically connect the focusing and tracking coils.

14. The electromagnetic objective lens driving apparatus of claim 13, wherein said printed circuit pattern supplies electrical power to the suspension wires.

15. The electromagnetic objective lens driving apparatus of claim 14, wherein said printed circuit pattern includes terminals to be connected to the sensors.

16. The electromagnetic objective lens driving apparatus of claim 7, wherein said objective lens holder comprises electrical wiring for connection with focusing and tracking coils provided on said objective lens holder, said focusing and tracking coils being secured to said objective lens holder.

17. The electromagnetic objective lens driving apparatus of claim 7, wherein said sensor comprises a plurality of photosensors, said potosensors constituting a differential detector.

18. The electromagnetic objective lens driving apparatus of claim 17, wherein said photosensors are reflection type photosensors.

19. The electromagnetic objective lens driving apparatus of claim 7, wherein said reflective surface is formed by a predetermined printed circuit pattern directly formed on the outer surface of said objective lens holder.

20. The electromagnetic objective lens driving apparatus of claim 7, wherein said sensor comprises a plurality of photosensors supported on said sensor holder, said printed circuit pattern directly formed on the outer surface of said sensor holder electrically connecting said photosensors.

21. The electromagnetic objective lens driving apparatus of claim 7, further comprising a supporting block secured to said carriage and connected to said objective lens holder through a plurality of suspension wires adapted to supply electrical power to focusing and tracking coils provided on said objective lens holder, said supporting block comprising a predetermined printed circuit pattern formed directly on an outer surface of said supporting block for supplying electrical power to said suspension wires.

22. The electromagnetic objective lens driving apparatus of claim 7, further comprising focusing and tracking permanent magnets on said carriage which, in association with focusing and tracking coils provided on said objective lens holder, comprise focusing and tracking electromagnetic drive circuits, and a magnetic member provided on said objective lens holder, said magnetic member being magnetically attracted to at least one of said focusing and tracking permanent magnets to urge said objective lens holder in an upward direction when said objective lens holder is located at a neutral position, said magnetic member being formed by a predetermined printed circuit pattern formed directly on the outer surface of said objective lens holder.

23. The electromagnetic objective lens driving apparatus of claim 22, further comprising an auxiliary magnetic member provided on said objective lens holder, said auxiliary magnetic member being positioned so that the magnetic attractive force between said magnetic member and said permanent magnets is balanced.

24. The electromagnetic objective lens driving apparatus of claim 23, wherein said auxiliary magnetic member is formed by a predetermined printed circuit pattern directly formed on the outer surface of said objective lens holder.

25. An electromagnetic objective lens driving apparatus of an optical disk data recording and reproducing apparatus, comprising:

a carriage that is movable in a radial direction of an optical disk;

an objective lens holder that supports an objective lens in such a manner that laser beams are converged onto the optical disk, said objective lens holder being supported on said carriage and movable in focusing and tracking directions of the optical disk;

focusing and tracking coils provided on said objective lens holder;

a supporting block secured to said carriage and connected to said objective lens holder through a plurality of suspension wires adapted to supply electrical power to said focusing and tracking coils, said supporting block comprising a predetermined printed circuit pattern formed directly on an outer surface of said supporting block for supplying electrical power to said suspension wires; and a sensor holder provided on said carriage for supporting a sensor that cooperates with a reflective surface formed on an outer surface in said objective lens holder and detects a position of said objective lens holder, said sensor holder comprising a predetermined printed circuit pattern directly formed on an outer surface of said sensor holder for electrically connecting and supplying said sensor with electrical power.

26. The electromagnetic objective lens driving apparatus of claim 25, wherein said objective lens holder comprises a molded plastic piece having electrical wiring for connection with said focusing and tracking coils provided on said objective lens holder, said wiring comprising a predetermined printed circuit pattern that is directly formed on an outer surface of said objective lens holder.

27. The electromagnetic objective lens driving apparatus of claim 25, wherein said reflective surface is formed by a predetermined printed circuit pattern directly formed on the outer surface of said objective lens holder.

* * * * *

UNITED STATES PATENT AND TRADEMARK OFFICE
CERTIFICATE OF CORRECTION

PATENT NO. : 5,526,340
DATED : June 11, 1996
INVENTOR(S) : Akihiro TANAKA

It is certified that error appears in the above-indentified patent and that said Letters Patent is hereby corrected as shown below:

On the cover, in section [56], "References Cited", "U.S. PATENT DOCUMENTS", insert ---5,068,844   11/1991 Tanaka---.

On the cover, in section [56], "References Cited", "U.S. PATENT DOCUMENTS", insert ---5,072,433   12/1991 Tanaka---.

On the cover, in section [56], "References Cited", "U.S. PATENT DOCUMENTS", insert ---5,078,471   1/1992 Takishima---.

On the cover, in section [56], "References Cited", "U.S. PATENT DOCUMENTS", insert ---5,103,345   4/1992 Watanabe et al.---.

On the cover, in section [56], "References Cited", "U.S. PATENT DOCUMENTS", insert ---5,191,570   3/1993 Shirai---.

On the cover, in section [56], "References Cited", "U.S. PATENT DOCUMENTS", insert ---5,222,056   6/1993 Tanaka---.

On the cover, in section [56], "References Cited", insert the heading ---FOREIGN PATENT DOCUMENTS---.

On the cover, in section [56], "References Cited", "FOREIGN PATENT DOCUMENTS", insert ---4-39132   6/1992 Japan---.

UNITED STATES PATENT AND TRADEMARK OFFICE
CERTIFICATE OF CORRECTION

PATENT NO. : 5,526,340
DATED : June 11, 1996
INVENTOR(S) : Akihiro TANAKA

It is certified that error appears in the above-indentified patent and that said Letters Patent is hereby corrected as shown below:

On the cover, in section [56], "References Cited", "Foreign Patent Documents", Insert --3-173941 7/91 Japan--.

Signed and Sealed this

Twenty-ninth Day of April, 1997

Attest:

BRUCE LEHMAN

Attesting Officer        Commissioner of Patents and Trademarks